US012684173B2

(12) United States Patent
Wenger

(10) Patent No.: US 12,684,173 B2
(45) Date of Patent: Jul. 14, 2026

(54) SIGNALLING REQUIRED NAL UNITS

(71) Applicant: Tencent America LLC, Palo Alto, CA (US)

(72) Inventor: Stephan Wenger, Hillsborough, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 10 days.

(21) Appl. No.: 18/824,367

(22) Filed: Sep. 4, 2024

(65) Prior Publication Data

US 2025/0080773 A1 Mar. 6, 2025

Related U.S. Application Data

(60) Provisional application No. 63/536,694, filed on Sep. 5, 2023.

(51) Int. Cl.
| *H04N 19/70* | (2014.01) |
| *H04N 19/132* | (2014.01) |
| *H04N 19/169* | (2014.01) |
| *H04N 19/172* | (2014.01) |
| *H04N 19/186* | (2014.01) |

(52) U.S. Cl.
CPC ........... *H04N 19/70* (2014.11); *H04N 19/132* (2014.11); *H04N 19/172* (2014.11); *H04N 19/186* (2014.11); *H04N 19/188* (2014.11)

(58) Field of Classification Search
CPC .... H04N 19/70; H04N 19/132; H04N 19/172; H04N 19/186; H04N 19/188
See application file for complete search history.

(56) References Cited

U.S. PATENT DOCUMENTS

| 2007/0121723 | A1* | 5/2007 | Mathew | ............. | H04N 21/2662 |
| | | | | | 375/E7.199 |
| 2014/0226720 | A1 | 8/2014 | Park | | |
| 2015/0103888 | A1* | 4/2015 | Chen | .................... | H04N 19/172 |
| | | | | | 375/240.02 |
| 2016/0241835 | A1* | 8/2016 | Ikai | ...................... | H04N 13/128 |
| 2021/0084306 | A1 | 3/2021 | Sasai et al. | | |
| 2022/0086431 | A1 | 3/2022 | Wang | | |
| 2022/0094958 | A1 | 3/2022 | Kim et al. | | |
| 2023/0164371 | A1 | 5/2023 | Denoual et al. | | |

OTHER PUBLICATIONS

Written Opinion of the International Search Authority issued Dec. 2, 2024 in International Application No. PCT/US24/45271.
International Search Report issued Dec. 2, 2024 in International Application No. PCT/US24/45271.

* cited by examiner

*Primary Examiner* — Maria E Vazquez Colon
(74) *Attorney, Agent, or Firm* — Sughrue Mion, PLLC

(57) ABSTRACT

A decoder is informed that a first NAL unit cannot be discarded by the decoder through at least one of: a profile indicated by a value of a profile identifier in a parameter set, the first type being indicative of a second NAL unit type, the second NAL unit type being a NAL unit in the NAL unit stream that is not required for the decoding of chroma or luma samples by the decoder, the first NAL unit being preceded by a Required Container NAL unit of a third NAL unit type, the first NAL unit being preceded by a Required Container NAL unit including a field indicating a number of following NAL units, the first NAL unit being encapsulated by a Required Container NAL unit, and the first NAL unit being preceded by a Required Container NAL unit Start and being followed by a Required Container NAL unit end.

20 Claims, 8 Drawing Sheets

130

140

150
Network

160
MANE

110

120

FIG. 2          Streaming System 200

FIG. 3      Decoder 210

FIG. 4   Encoder 203

FIG. 6

| SPS 702 |
| --- |
| Profile_id 701 |

| Other NAL Unit(s) 705 |
| --- |

| First SEI Msg 703 |
| --- |
| 1st SEI-type 706 |

| Other NAL Unit(s) 705 |
| --- |

| Second SEI Msg 704 |
| --- |
| 2nd SEI-type 707 |

| Other NAL Unit(s) 705 |
| --- |

Computer System 900

SIGNALLING REQUIRED NAL UNITS

CROSS-REFERENCE TO RELATED APPLICATION

This application claims priority from U.S. Provisional Application No. 63/536,694 filed on Sep. 5, 2023, the disclosure of which is incorporated herein by reference in its entirety.

FIELD

The disclosed subject matter relates to video coding and decoding, and more specifically, to mechanisms to signal the required processing of an SEI message by a system.

BACKGROUND

Video coding and decoding using inter-picture prediction with motion compensation has been known for decades. Uncompressed digital video can consist of a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GByte of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signal is small enough to make the reconstructed signal useful for the intended application. In the case of video, lossy compression is widely employed. The amount of distortion tolerated depends on the application; for example, users of certain consumer streaming applications may tolerate higher distortion than users of television contribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding, some of which will be introduced below.

Some video coding specifications and standards, including ITU-T H.266v2, incorporated herein in its entirety, include SEI messages. In those specifications or standards, SEI messages, by definition, are not required for the decoding of luma or chroma sample data. Some system technologies may discard such SEI messages under certain conditions.

SUMMARY

The disclosed subject matter relates to video coding and decoding, and more specifically, to mechanisms to signal the required processing of an SEI message by a system.

According to an aspect of the disclosure, a method of video decoding performed by at least one processor of a decoder includes: receiving (i) one or more encoded pictures and (ii) a NAL unit stream comprising at least one first Network Abstraction Layer Unit (NAL unit) of a first type; interpreting the first NAL unit; and decoding at least one of the one or more encoded pictures in accordance with the interpreting the first NAL unit, wherein the decoder is informed that the first NAL unit cannot be discarded by the decoder through at least one of: a profile indicated by a value of a profile identifier in an active parameter set, the first type being indicative of a second NAL unit type, the second NAL unit type being a NAL unit in the NAL unit stream that is not required for the decoding of chroma or luma samples by the decoder, the first NAL unit being preceded by a Required Container NAL unit of a third NAL unit type, the first NAL unit being preceded by a Required Container NAL unit including a field indicating a number of following NAL units, the first NAL unit being encapsulated by a Required Container NAL unit, and the first NAL unit being preceded by a Required Container NAL unit Start and being followed by a Required Container NAL unit end.

According to an aspect of the disclosure, a method of video encoding performed by at least one processor of an encoder includes generating a NAL unit stream comprising at least one first Network Abstraction Layer Unit (NAL unit) of a first type; and encoding one or more encoded pictures in accordance with the first NAL unit, wherein the NAL unit stream indicates that the first NAL unit cannot be discarded through at least one of: a profile indicated by a value of a profile identifier in an active parameter set, the first type being indicative of a second NAL unit type, the second NAL unit type being a NAL unit in the NAL unit stream that is not required for processing chroma or luma samples, the first NAL unit being preceded by a Required Container NAL unit of a third NAL unit type, the first NAL unit being preceded by a Required Container NAL unit including a field indicating a number of following NAL units, the first NAL unit being encapsulated by a Required Container NAL unit, and the first NAL unit being preceded by a Required Container NAL unit Start and being followed by a Required Container NAL unit end.

According to an aspect of the disclosure, a method performed by at least one processor comprises: receiving a NAL unit stream comprising at least one first Network Abstraction Layer Unit (NAL unit) of a first type, wherein a decoder is informed that the first NAL unit cannot be discarded by the decoder through at least one of: a profile indicated by a value of a profile identifier in an active parameter set, the first type being indicative of a second NAL unit type, the second NAL unit type being a NAL unit in the NAL unit stream that is not required for the decoding of chroma or luma samples by the decoder, the first NAL unit being preceded by a Required Container NAL unit of a third NAL unit type, the first NAL unit being preceded by a Required Container NAL unit including a field indicating a number of following NAL units, the first NAL unit being encapsulated by a Required Container NAL unit, and the first NAL unit being preceded by a Required Container NAL unit Start and being followed by a Required Container NAL unit end.

BRIEF DESCRIPTION OF DRAWINGS

Further features, the nature, and various advantages of the disclosed subject matter will be more apparent from the following detailed description and the accompanying drawings in which:

FIG. 6 is a schematic illustration of signaling the required presence of SEI message through profile_id in accordance with an embodiment.

DETAILED DESCRIPTION

Figure 1:
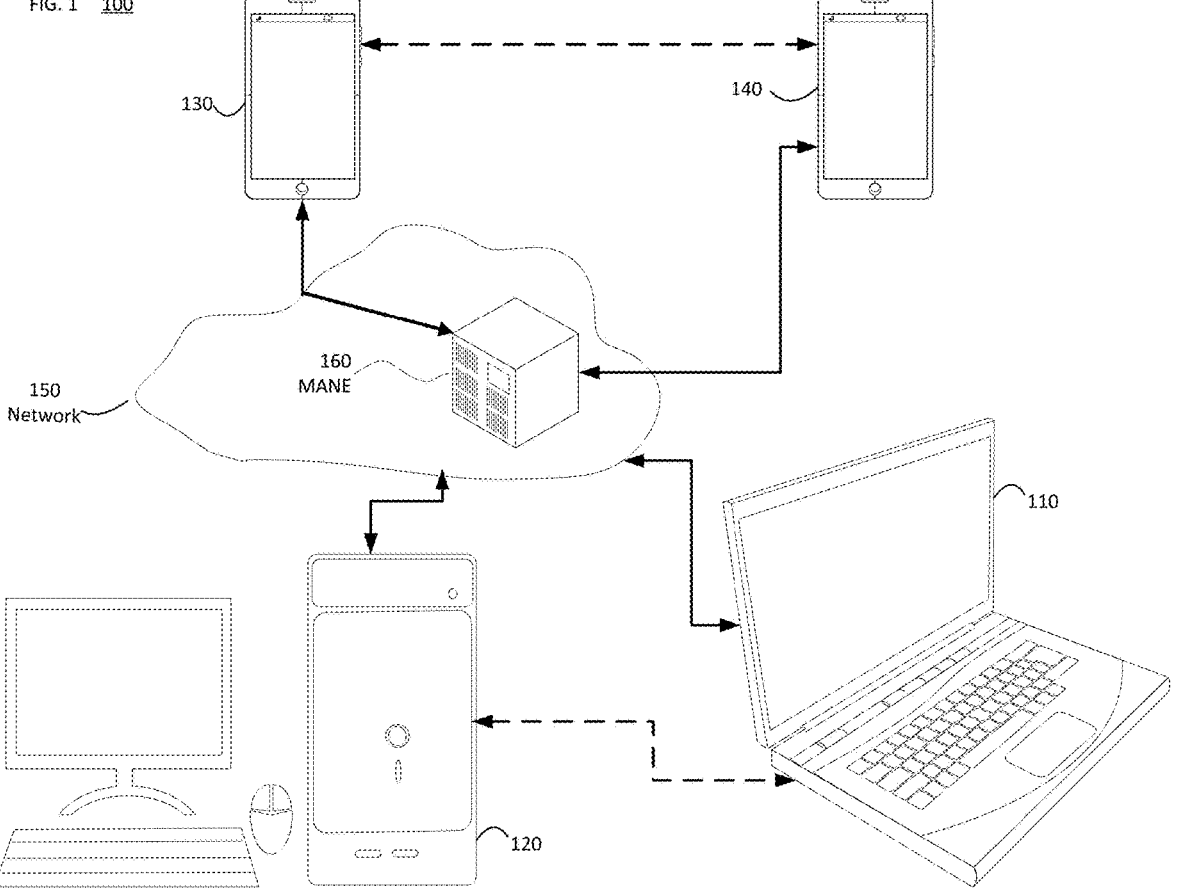
FIG. 1 is a schematic illustration of a simplified block diagram of a communication system in accordance with an embodiment.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure may be practiced without one or more of the specific features or advantages of a particular embodiment. In other instances, additional features and advantages may be recognized in certain embodiments that may not be present in all embodiments of the present disclosure.

SEI messages are not required to be processed and decoded by the luma/chroma sample decoder, and therefore, sometimes considered "optional" in system standards. Therefore, some system standards recommend removal of SEI messages in scenarios such as network congestion. However, recent advances in certain fields of video decoding including video coding for machines and neural-network based guided post filters make it advisable for a system to forward related SEI messages even in the presence of network congestion. Therefore, a mechanism is needed to inform network based middleboxes that certain SEI messages are required from a receiving system perspective, even if they are not required from a luma/chroma sample decoding perspective.

FIG. 1 illustrates a simplified block diagram of a communication system (100) according to an embodiment of the present disclosure. The system (100) may include at least two terminals (110-120) interconnected via a network (150). For unidirectional transmission of data, a first terminal (110) may code video data at a local location for transmission to the other terminal (120) via the network (150). The second terminal (120) may receive the coded video data of the other terminal from the network (150), decode the coded data and display the recovered video data. Unidirectional data transmission may be common in media serving applications and the like.

FIG. 1 illustrates a second pair of terminals (130, 140) provided to support bidirectional transmission of coded video that may occur, for example, during videoconferencing. For bidirectional transmission of data, each terminal (130, 140) may code video data captured at a local location for transmission to the other terminal via the network (150). Each terminal (130, 140) also may receive the coded video data transmitted by the other terminal, may decode the coded data and may display the recovered video data at a local display device.

In FIG. 1, the terminals (110-140) may be illustrated as servers, personal computers and smart phones but the principles of the present disclosure may be not so limited. Embodiments of the present disclosure find application with laptop computers, tablet computers, media players and/or dedicated video conferencing equipment. The network (150) represents any number of networks that convey coded video data among the terminals (110-140), including for example wireline and/or wireless communication networks. The communication network (150) may exchange data in circuit-switched and/or packet-switched channels. Representative networks include telecommunications networks, local area networks, wide area networks and/or the Internet. For the purposes of the present discussion, the architecture and topology of the network (150) may be immaterial to the operation of the present disclosure unless explained herein below. The network (150) may include Media Aware Network Elements (MANEs, 160) that may be included in the transmission path between, for example, terminal (130) and (140). The purpose of a MANE may be selective forwarding of parts of the media data to react to network congestions, media switching, media mixing, archival, and similar tasks commonly performed by a service provider rather than an end user. Such MANEs may be able to parse and react on a limited part of the media conveyed over the network, for example syntax elements related to the network abstraction layer of video coding technologies or standards.

Figure 2:
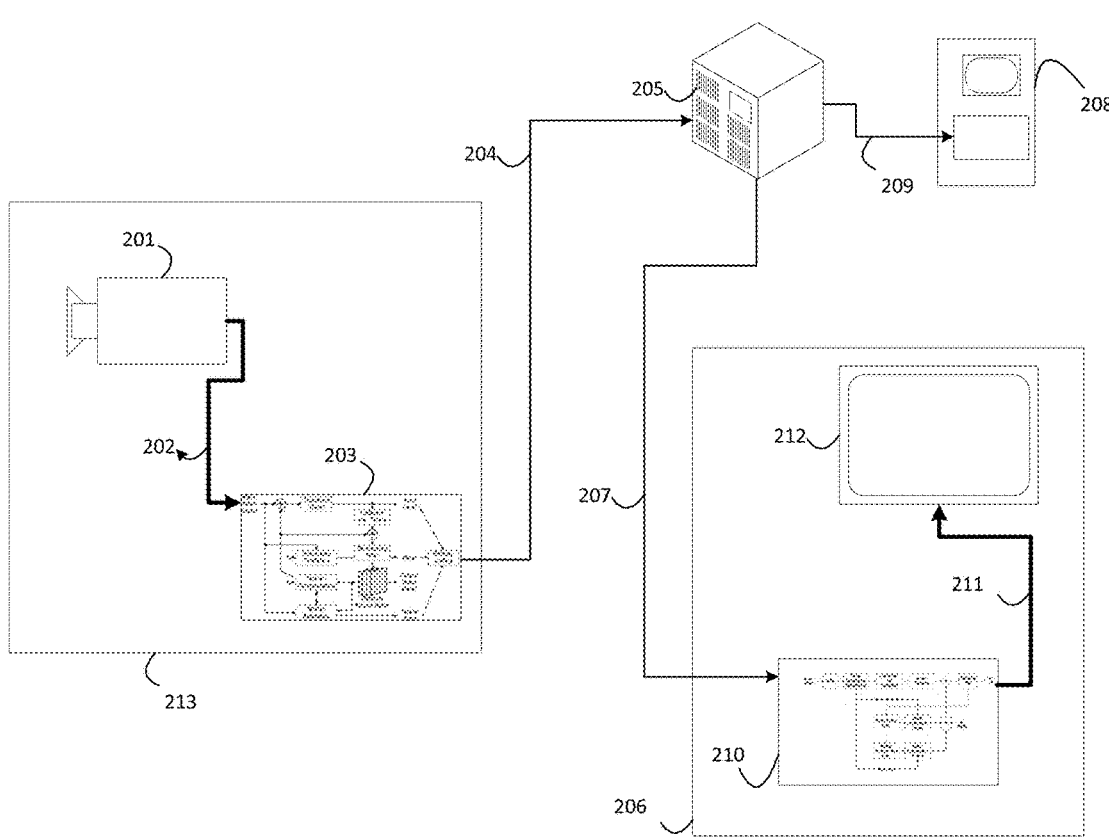
FIG. 2 is a schematic illustration of a simplified block diagram of a communication system in accordance with an embodiment.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (213), that can include a video source (201), for example a digital camera, creating a for example uncompressed video sample stream (202). That sample stream (202), depicted as a bold line to emphasize a high data volume when compared to encoded video bitstreams, can be processed by an encoder (203) coupled to the camera (201). The encoder (203) can include hardware, software, or a combination thereof to enable or implement aspects of the disclosed subject matter as described in more detail below. The encoded video bitstream (204), depicted as a thin line to emphasize the lower data volume when compared to the sample stream (202), can be stored on a streaming server (205) for future use. One or more streaming clients (206, 208) can access the streaming server (205) to retrieve copies (207, 209) of the encoded video bitstream (204). A client (206) can include a video decoder (210) which decodes the incoming copy of the encoded video bitstream (207) and creates an outgoing video sample stream (211) that can be rendered on a display (212) or other rendering device (not depicted). In some streaming systems, the video bitstreams (204, 207, 209) can be encoded according to certain video coding/compression standards. Examples of those standards include ITU-T Recommendations H.265 and H.266. The disclosed subject matter may be used in the context of VVC.

Figure 3:
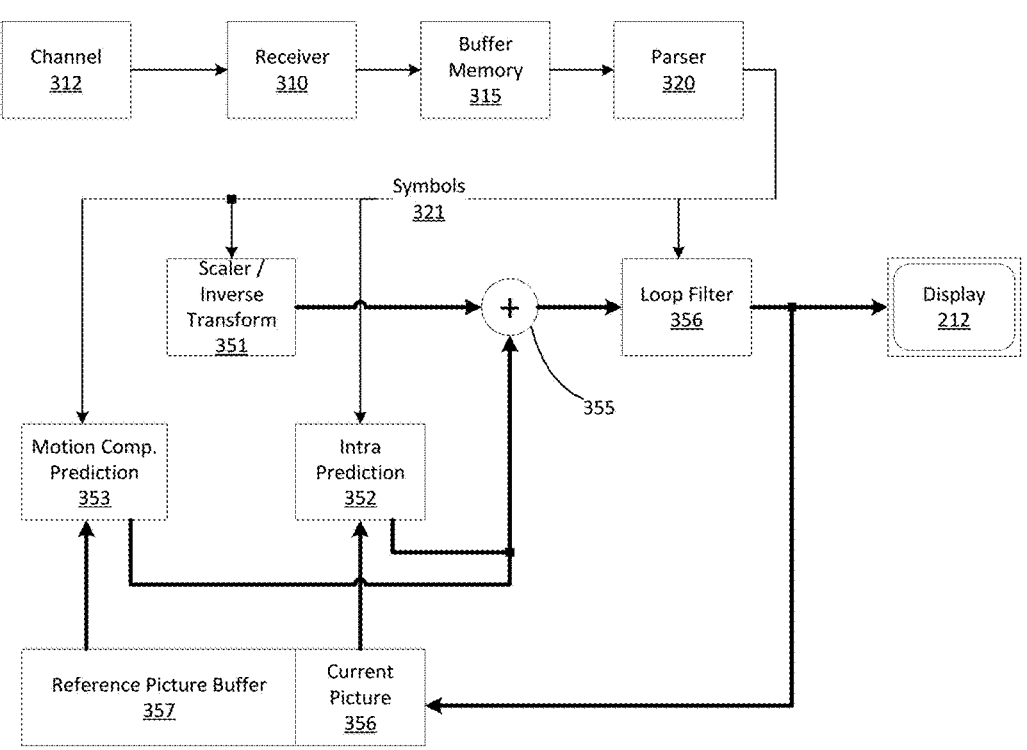
FIG. 3 is a schematic illustration of a simplified block diagram of a decoder in accordance with an embodiment.

FIG. 3 may be a functional block diagram of a video decoder (210) according to an embodiment of the present invention.

A receiver (310) may receive one or more codec video sequences to be decoded by the decoder (210); in the same or another embodiment, one coded video sequence at a time, where the decoding of each coded video sequence is independent from other coded video sequences. The coded video sequence may be received from a channel (312), which may be a hardware/software link to a storage device which stores the encoded video data. The receiver (310) may receive the encoded video data with other data, for example, coded audio data and/or ancillary data streams, that may be forwarded to their respective using entities (not depicted). The receiver (310) may separate the coded video sequence from the other data. To combat network jitter, a buffer memory (315) may be coupled in between receiver (310) and entropy decoder/parser (320) ("parser" henceforth). When receiver (310) is receiving data from a store/forward device of sufficient bandwidth and controllability, or from an isosynchronous network, the buffer (315) may not be needed, or can be small. For use on best effort packet networks such as the Internet, the buffer (315) may be required, can be comparatively large and can advantageously of adaptive size.

The video decoder (210) may include a parser (320) to reconstruct symbols (321) from the entropy coded video sequence. Categories of those symbols include information used to manage operation of the decoder (210), and potentially information to control a rendering device such as a display (212) that is not an integral part of the decoder but can be coupled to it, as was shown in FIG. 2. The control information for the rendering device(s) may be in the form of Supplementary Enhancement Information (SEI messages) or Video Usability Information (VUI) parameter set fragments (not depicted). The parser (320) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter values, motion vectors, and so forth.

The parser (320) may perform entropy decoding/parsing operation on the video sequence received from the buffer (315), so to create symbols (321).

Reconstruction of the symbols (321) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (320). The flow of such subgroup control information between the parser (320) and the multiple units below is not depicted for clarity.

Beyond the functional blocks already mentioned, decoder 210 can be conceptually subdivided into a number of functional units as described below. In a practical implementation operating under commercial constraints, many of these units may interact closely with each other and can, at least partly, be integrated into each other. However, for the purpose of describing the disclosed subject matter, the conceptual subdivision into the functional units below is appropriate.

A first unit is the scaler/inverse transform unit (351). The scaler/inverse transform unit (351) receives quantized transform coefficient as well as control information, including which transform to use, block size, quantization factor, quantization scaling matrices, etc. as symbol(s) (321) from the parser (320). It can output blocks comprising sample values, that can be input into aggregator (355).

In some cases, the output samples of the scaler/inverse transform (351) can pertain to an intra coded block; that is: a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current (partly reconstructed) picture (356). The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a Motion Compensation Prediction unit (353) can access reference picture memory (357) to fetch samples used for prediction. After motion compensating the fetched samples in accordance with the symbols (321) pertaining to the block, these samples can be added by the aggregator (355) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (321) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video bitstream and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to the render device (212) as well as stored in the reference picture memory (356) for use in future inter-picture prediction.

Certain coded pictures, once fully reconstructed, can be used as reference pictures for future prediction. Once a coded picture is fully reconstructed and the coded picture has been identified as a reference picture (by, for example, parser (320)), the current reference picture (356) can become part of the reference picture buffer (357), and a fresh current picture memory can be reallocated before commencing the reconstruction of the following coded picture.

The video decoder 320 may perform decoding operations according to a predetermined video compression technology that may be documented in a standard, such as ITU-T Rec. H.266. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (310) may receive additional (redundant) data with the encoded video. The additional data may be included as part of the coded video sequence(s). The additional data may be used by the video decoder (320) to properly decode the data and/or to more accurately reconstruct the original video data. Additional data can be in the form of, for example, temporal, spatial, or SNR enhancement layers, redundant slices, redundant pictures, forward error correction codes, and so on.

Figure 4:
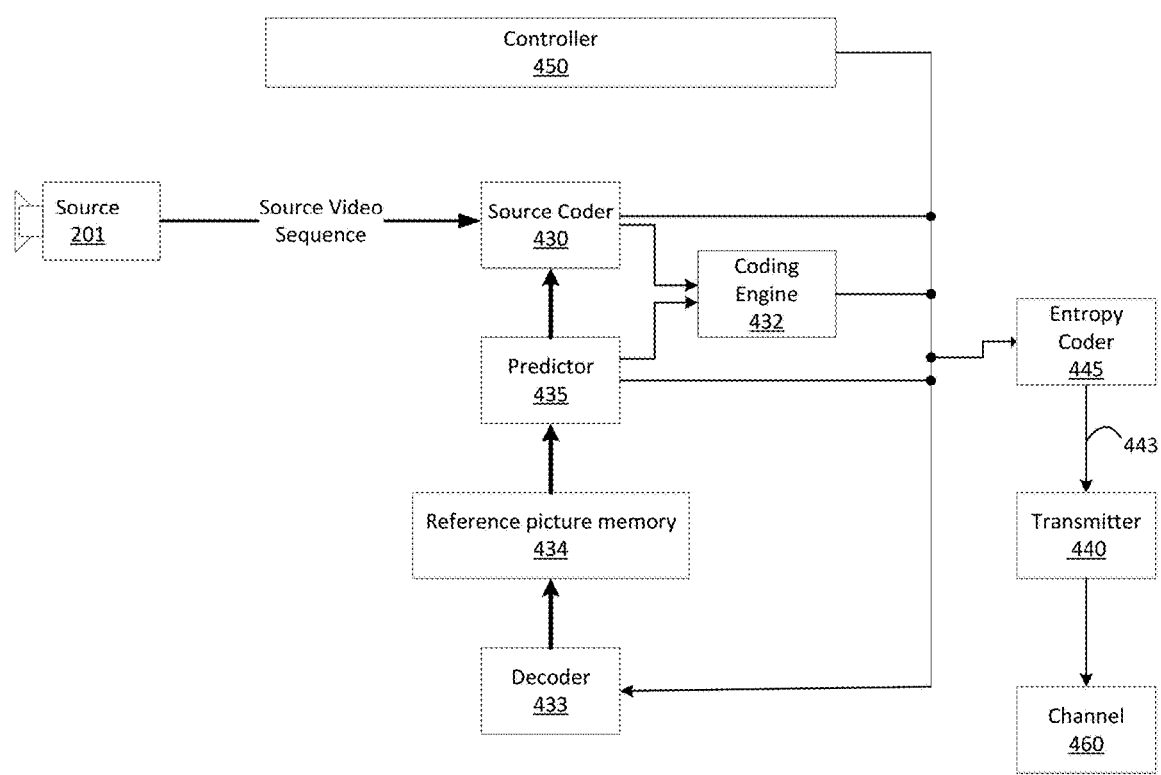
FIG. 4 is a schematic illustration of a simplified block diagram of an encoder in accordance with an embodiment.

FIG. 4 may be a functional block diagram of a video encoder (203) according to an embodiment of the present disclosure.

The encoder (203) may receive video samples from a video source (201) (that is not part of the encoder) that may capture video image(s) to be coded by the encoder (203).

The video source (201) may provide the source video sequence to be coded by the encoder (203) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (201) may be a storage device storing previously prepared video. In a videoconferencing system, the video source (203) may be a camera that captures local image information as a video sequence. Video data may be provided as a plurality of individual pictures that impart motion when viewed in sequence. The pictures themselves may be organized as a spatial array of pixels, wherein each pixel can comprise one or more sample depending on the sampling structure, color space, etc. in use. A person skilled in the art can readily understand the relationship between pixels and samples. The description below focusses on samples.

According to an embodiment, the encoder (203) may code and compress the pictures of the source video sequence into a coded video sequence (443) in real time or under any other time constraints as required by the application. Enforcing appropriate coding speed is one function of Controller (450). Controller controls other functional units as described below and is functionally coupled to these units. The coupling is not depicted for clarity. Parameters set by controller can include rate control related parameters (picture skip, quantizer, lambda value of rate-distortion optimization techniques), picture size, group of pictures (GOP) layout, maximum motion vector search range, and so forth. A person skilled in the art can readily identify other functions of controller (450) as they may pertain to video encoder (203) optimized for a certain system design.

Some video encoders operate in what a person skilled in the are readily recognizes as a "coding loop". As an oversimplified description, a coding loop can consist of the encoding part of an encoder (430) ("source coder" henceforth) (responsible for creating symbols based on an input picture to be coded, and a reference picture(s)), and a (local) decoder (433) embedded in the encoder (203) that reconstructs the symbols to create the sample data a (remote)

decoder also would create (as any compression between symbols and coded video bitstream is lossless in the video compression technologies considered in the disclosed subject matter). That reconstructed sample stream is input to the reference picture memory (434). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder (433) can be the same as of a "remote" decoder (210), which has already been described in detail above in conjunction with FIG. 3. Briefly referring also to FIG. 3, however, as symbols are available and en/decoding of symbols to a coded video sequence by entropy coder (445) and parser (320) can be lossless, the entropy decoding parts of decoder (210), including channel (312), receiver (310), buffer (315), and parser (320) may not be fully implemented in local decoder (433).

An observation that can be made at this point is that any decoder technology except the parsing/entropy decoding that is present in a decoder also necessarily needs to be present, in substantially identical functional form, in a corresponding encoder. For this reason, the disclosed subject matter focusses on decoder operation. The description of encoder technologies can be abbreviated as they are the inverse of the comprehensively described decoder technologies. Only in certain areas a more detail description is required and provided below.

As part of its operation, the source coder (430) may perform motion compensated predictive coding, which codes an input frame predictively with reference to one or more previously-coded frames from the video sequence that were designated as "reference frames." In this manner, the coding engine (432) codes differences between pixel blocks of an input frame and pixel blocks of reference frame(s) that may be selected as prediction reference(s) to the input frame.

The local video decoder (433) may decode coded video data of frames that may be designated as reference frames, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference frames and may cause reconstructed reference frames to be stored in the reference picture cache (434). In this manner, the encoder (203) may store copies of reconstructed reference frames locally that have common content as the reconstructed reference frames that will be obtained by a far-end video decoder (absent transmission errors).

The predictor (435) may perform prediction searches for the coding engine (432). That is, for a new frame to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the video coder (430), including, for example, setting of parameters and subgroup parameters used for encoding the video data.

Output of all aforementioned functional units may be subjected to entropy coding in the entropy coder (445). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (440) may buffer the coded video sequence(s) as created by the entropy coder (445) to prepare it for transmission via a communication channel (460), which may be a hardware/software link to a storage device which would store the encoded video data. The transmitter (440) may merge coded video data from the video coder (430) with other data to be transmitted, for example, coded audio data and/or ancillary data streams (sources not shown).

The controller (450) may manage operation of the encoder (203). During coding, the controller (450) may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (203) may perform coding operations according to a predetermined video coding technology or standard, such as ITU-T Rec. H.266. In its operation, the video coder (203) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The video coder (430) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Compressed video can be augmented, in the video bitstream, by supplementary enhancement information, for example in the form of Supplementary Enhancement Information (SEI) Messages or Video Usability Information (VUI). Video coding standards can include specifications parts for SEI and VUI. SEI and VUI information may also be specified in stand-alone specifications that may be referenced by the video coding specifications.

Figure 5:
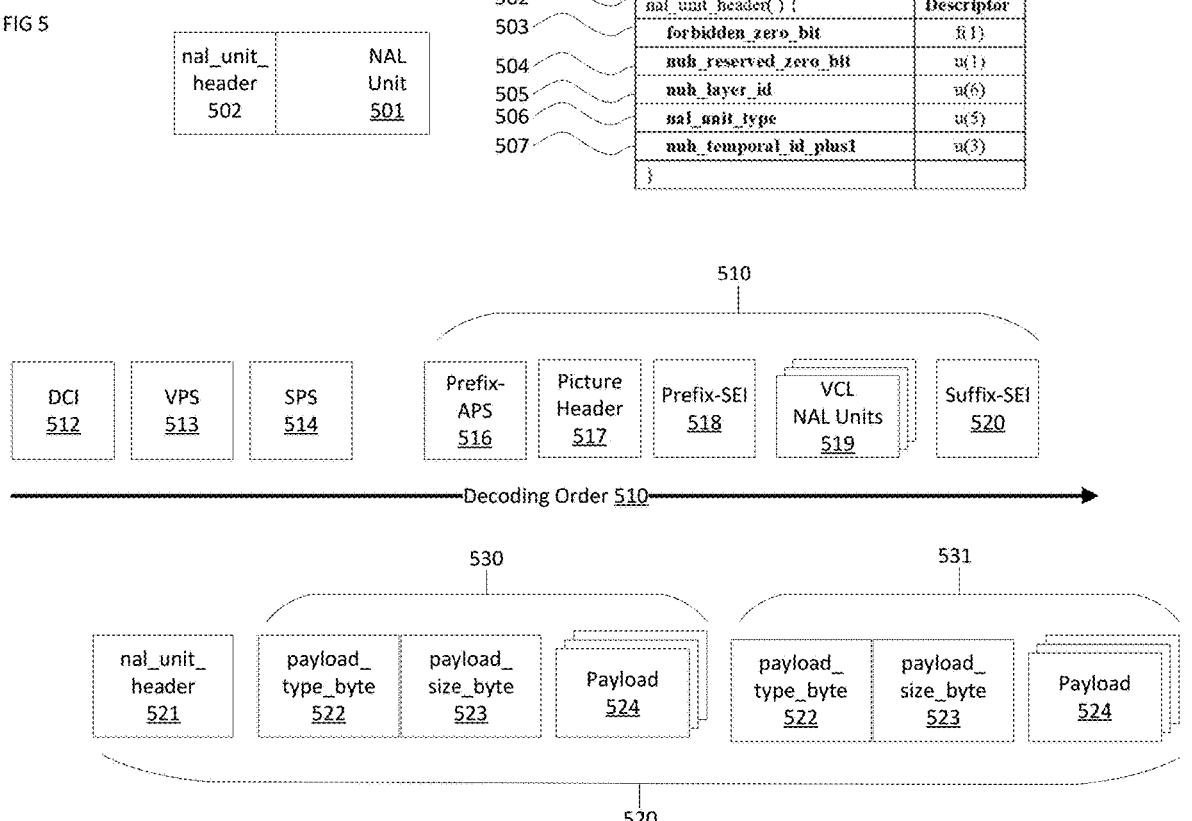
FIG. 5 is a schematic illustration of NAL unit and SEI headers in accordance with an embodiment.

Referring to FIG. 5, shown is an exemplary layout of a Coded Video Sequence (CVS) in accordance with H.266. The coded video sequence is subdivided into Network Abstraction Layer units (NAL units). An exemplary NAL unit (501) can include a NAL unit header (502), which in turn comprises 16 bits as follows: a forbidden_zero_bit (503) and nuh_reserved_zero_bit 504) may be unused by H.266 and may be zero in a NAL unit. compliant with H.266. Three bits of nuh_layer_id (505) may be indicative of the (spatial, SNR, or multiview enhancement) layer to which the NAL unit belongs. Five bits of nuh_nal_unit_type define the type of NAL unit. In H.266 (04/2022), 22 NAL unit type values are defined for NAL unit types defined in H.266, six NAL unit types are reserved, and four NAL unit type values are unspecified and can be used by specifications other than H.266. Finally, three bits of the NAL unit header indicate the temporal layer to which the NAL unit belongs nuh_temporal_id_plus1 (506).

A coded picture may contain one or more Video Coding Layer (VCL) NAL units and zero or more non-VCL NAL units. VCL NAL units may contain coded data conceptually belonging to a video coding layer as introduced before. Non-VCL NAL units may contain data conceptually belonging data not conceptually belonging to the video coding layer. Using H.266 as an example, they can be categorized into (1) Parameter sets, which comprise information that can be necessary for the decoding process and can apply to more than one coded picture. Parameter sets and conceptually similar NAL units may be of NAL unit types such as DCI_NUT (Decoding Capability Information (DCI)), VPS_NUT (Video Parameter Set (VPS), establishing, among other things, layer relationships), SPS_NUT (Sequence Parameter Set (SPS), establishing, among other things, parameters used and staying constant throughout a coded video sequence CVS), PPS_NUT (Picture Parameter Set (PPS), establishing, among other things, parameter used and staying constant within a coded picture), and PREFIX_APS_NUT and SUFFIX_APS_NUT (prefix and suffix Adaptation Parameter Sets). Parameter sets may include information required for a decoder to decode VCL NAL units, and hence are referred here as "normative" NAL units.

(2) Picture Header (PH NUT), which is also a "normative" NAL unit.

(3) NAL units marking certain places in a NAL unit stream. Those include NAL units with the NAL unit types AUD_NUT (Access Unit Delimiter), EOS_NUT (End of Sequence) and EOB_NUT (End of Bitstream). These are non-normative, also known as informative, in the sense that a compliant decoder does not require them for its decoding process, although it needs to be able to receive them in the NAL unit stream.

(4) Prefix and Suffix SEI NAL unit types (PREFIX_SEI_NUT and SUFFIX_SEI_NUT) which indicate NAL units containing Prefix and Suffix supplementary enhancement information. IN H.266 (04/2022), those NAL units are informative, as they are not required for the decoding process.

(5) Filler Data NAL unit type FD_NUT indicates filler data; data that can be random and can be used to "waste" bits in a NAL unit stream or bitstream, which may be necessary for the transport over certain isochronous transport environments.

(6) Reserved and Unspecified NAL unit types.

Still referring to FIG. 5, shown is a layout of a NAL unit stream in decoding order (510) containing a coded picture (511) containing NAL units of some of the types previously introduced. Somewhere early in the NAL unit stream, DCI (512), VPS (513), and SPS (514) may, in combination, establish the parameters which the decoder can use to decode the coded pictures of a coded video sequence (CVS), including coded picture (511) of the NAL unit stream.

The coded picture (511) can contain, in the depicted order or any other order compliant with the video coding technology or standard in use (here: H.266): a Prefix APS (516), Picture header (PH, 517), prefix SEI (518), one or more VCL NAL units (519), and suffix SEI (520).

Prefix and suffix SEI NAL units (518 and 520) were motivated during the standards development as, for some SEI messages, the content of the message would be known before the coding of a given picture commences, whereas other content would only be known once the picture were coded. Allowing certain SEI messages to appear early or late in a coded picture's NAL unit stream through prefix and suffix SEIs allows buffering to be avoided. In one or more examples, in an encoder, the sampling time of a picture to be coded is known before the picture is coded, and hence the picture timing SEI message can be a prefix SEI message (516). On the other hand, a decoded picture hash SEI message, which contains a hash of the sample values of a decoded pictures and can be useful, for example, to debug encoder implementations, is a suffix SEI message (518) as an encoder cannot calculate a hash over reconstructed samples before a picture has been coded. The location of Prefix and Suffix SEI NAL units may not be restricted to their position in the NAL unit stream. The phrase "Prefix" and "Suffix" may imply to what coded pictures or NAL units the Prefix/Suffix SEI message may pertain to, and the details of this applicability may be specified, for example in the semantics description of a given SEI message.

Still referring to FIG. 5, show is a simplified syntax diagram of a NAL unit that contains a prefix SEI message 518 or suffix SEI message 520. This syntax may be a container format for multiple SEI messages that can be carried in one NAL unit. Details of the emulation prevention syntax specified in H.266 are omitted here for clarity. As other NAL units, SEI NAL units start with a NAL unit header (521). The header is followed by one or more SEI messages; two are depicted (530, 531) and described henceforth. Each SEI message inside the SEI NAL unit includes an 8 bit payload_type_byte (522) which specifies one of 256 different SEI types; an 8 bit payload_size_byte (523) which specifies the number of bytes of the SEI payload, and payload_size-byte number of bytes Payload (524). This structure can be repeated until a payload_type_byte equal to 0xff is observed, which indicates the end of the NAL unit. The syntax of the Payload (524) depends on the SEI message, it can be of any length between 0 and 255 bytes.

Some current and previous generation video compression standards, including for example H.266, characterize SEI messages as not required for the decoding process of luma and chroma samples. Some system standards, especially those that specify the transmission of video over bandwidth-constrained links, include language suggesting that when network congestion requires the network or middleboxes therein to drop data from the NAL unit stream, SEI messages may advantageously be dropped before NAL units be dropped that are required for the luma/chroma sample decoding process.

Certain system environments may require that the decoder receives certain SEI messages, and the system standards may therefore specify that such SEI messages must be created and sent by an encoder or sending system (in certain intervals or under certain conditions that may depend on the nature of the SEI message), must be conveyed by the network, and must be received, interpreted, and acted upon, by the receiving system. As an example, that may be true for the Picture Timing SEI message, the Recovery Point SEI message, and the User Data T.35 SEI message when using H.265 in the DVP TS 101 154 specification. If sending and receiving systems were operated not in their native environment as specified in the system standard but in a network environment where middleboxes are configured to drop SEI messages once congestion occurs, unexpected and potentially inconvenient or even fatal reactions may occur at the receiver or decoder as such systems may rely on the content of a dropped SEI message. Such scenarios may become increasingly important as network convergence progresses.

Under development in MPEG are certain enhancement of encoder and decoder technologies, for example, related to Video Coding for Machines (VCM) or employing certain guided post filters like a Neural Network based Post Filter. (NNPF). Such systems may employ certain SEI messages under the assumption that they are delivered to the receiving system. For example, the NNVC SEI message and its related activation SEI message, as present in H.274, guide a neural-network based post filter to optimize the decoder output. If those SEI messages were not received in the NAL unit stream, the result could be less than optimal post-filtered video as the guidance information of the post filter is not available. This is an example where the dropping of an SEI messages can have undesirable but non-fatal effects on the overall system environment. Under consideration in MPEG in the VCM context are also SEI messages controlling a Neural Network based intra coding that may replace the intra codec built into the H.266 encoder. If such SEI messages were dropped by the network, the result would be fatal in that, without decoded intra pictures, the remaining reconstructed bitstream may be unusable even if reconstruction were possible (which it may not be).

Many audiovisual service architectures rely on media-aware network elements that in under certain conditions might drop SEI NAL Units, as they are, by definition, not required for the luma and chroma decoding process. However, some of those SEI messages are also required by some applications to ensure a consistent quality of service and experience across the users. The embodiments of the present disclosure provide a solution to signal the SEI messages required to be maintained in the bitstream by an application. Further, a mechanism is proposed that can also mark NAL units of types other than SEI as required.

A common service architecture of video delivery includes network elements in charge of content filtering and adaptation. This can be illustrated in the 2 examples.

First, in conversational services, where a multi-point immersive teleconferencing system, as defined in 3GPP TS 26.114 MTSI, relies on the Media Resource Function (MRF) as the central Media Control Unit (MCU).

In large conference topologies that are supported using MSMTSI (Multi-Stream Multimedia Telephony Service for IMS) as defined in Annex S of the MTSI standard, the support for multiple receivers with varying capabilities is provided through a media processing entity in the media path known as the Media Resource Function (MRF). The MRF, in the case of immersive conferencing scenario, can provide viewport-dependent processing 360-degree video to multiple clients and transcoding functionalities.

Another example is related to multimedia streaming in which the video signal crosses several network entities before being received by the end users. In audiovisual distribution scenarios network elements include video content processing functions, storage, and adaptation in the cloud CDNs.

In the 2 above scenarios, some MANEs are in charge of interpreting the video signal. The purpose of a MANE may be selective forwarding of parts of the media data to react to network congestions, media switching, media mixing, archival, and similar tasks commonly performed by a service provider rather than an end user.

In case of bandwidth constraints or processing limitations, some NAL Units identified as not relevant for the video decoding may be dropped. In fact, some system standards, especially those that specify the transmission of video over bandwidth-constrained links (e.g., RTP payload format for H.264), include language suggesting that when facing network congestion requires the network or to drop data from the NAL unit stream. SEI messages, that are, by definition, not required for the decoding of luma or chroma sample data, are usually identified as the prime ones to be discarded when facing network congestion or computation capacity limitations.

However, recent advances in certain fields of video decoding including video coding for machines and neural network based guided post filters make it advisable for a system to forward related SEI messages even in the presence of the above cited limitations.

If sending and receiving systems were operated not in their native environment as specified in the system standard, but in a network environment where MANEs are configured to drop SEI messages once congestion occurs, a DVB receiver would identify an interoperability issue potentially leading to a fatal error or a deny of service. Such scenarios may become increasingly important as network convergence progresses.

Also under development in MPEG are certain enhancements of encoder and decoder technologies, for example related to VCM or employing guided post filters like an NNPF. Such systems may employ certain SEI messages under the assumption that they are delivered to the receiving system.

For example, the NNVC SEI message and its related activation SEI message, as present in H.274, guide a neural network based post filter to optimize the decoder output. If those SEI messages were not received in the NAL unit stream, the result could be less than optimal post-filtered video as the guidance information of the post filter is not available. Therefore, a mechanism is needed to inform network-based elements that certain SEI messages are required from a receiving system perspective, even if they are not required from a luma/chroma sample decoding perspective.

A general trend observable in the standardization of media transport in places such as the IETF has been, for years, to enable end-to-end encrypted content. End-to-end encrypted content, however, makes media-aware processing of the content difficult, because a media-aware network element (MANE) cannot "see" syntax elements that are encrypted. For RTP-based transport, the trend seems to expose certain (small) pieces of information outside of the security context that a MANE can "see" and hence act on. For the ITU/ MPEG-based video technologies, that part is, very generally speaking, the syntax elements present in the NAL unit header: layer and sublayer information, and NAL unit type. Anything deeper in the video syntax is not visible to the MANE as it is encrypted. Therefore, SEI message type information may not be an appropriate solution. A secondary, and probably surmountable implementation problem would be that MANEs handle thousands of streams in parallel on a general purpose processor, and hence, have stricter computational complexity restrictions than decoders.

What is therefore needed is a mechanism that allows signaling network elements, and the decoder, that certain SEI messages, or certain NAL units of types not normally required for the decoding process, must not be dropped and must be decoded and interpreted and, if the SEI message or NAL unit specification indicates so, forwarded to elements in the receiver responsive to such content—for example, the neural network post filter configuration information. The Embodiments include defining a signalling at a same level of the NAL unit types, ensuring the interpretation of scrambled contents In a first embodiment, a profile specification of a video coding standard makes certain SEI messages mandatory to process. Referring to FIG. 6, Profiles can be a specification (such as present in Annex A of H.266) that normatively describe the value of certain syntax elements, thereby allowing or forbidding certain tools. FIG. 6. Shows a NAL unit stream. A profile indication (701) can be carried, for example, in parameter sets, for example a Sequence Parameter Set (SPS) (702). A profile description, in the embodiment, can for example state that a certain first SEI message (703) must be present in the bitstream, for example at certain intervals, or associated with key frames, or similar trigger events, while a second SEI message (704) may or may not be present in the bitstream. Note that the NAL unit stream may also contain other NAL units (705), and those are not depicted here in detail for clarity. A profile description can further state that a decoder must receive that first SEI message (703) of a first SEI type (706), while the decoder has the choice of receiving or dropping the second SEI message (704) of a second SEI type (707). That implies that the decoder must parse all SEI messages (703, 704) at least to the point where that SEI message can be identified, for example by interpreting, in combination, the NAL unit type of the NAL unit containing the SEI message, and SEI type (706, 707), both described further below.

While such additions in the video codec specification and video encoder and decoder can be comparatively easy to specify and to implement, in the system layer specification and processing units such as middleboxes they can lead to high complexity. Referring to FIG. 1, consider a scenario where terminal (130) communicates with terminal (140) over the network (150) involving a selective forwarding unit (SFU) middlebox (160). The SFU (160) can, for example, be configured to drop certain NAL units if it senses congestion on its outgoing link. In order to do so, SFU (160) can easily interpret certain fields in the NAL unit header. However, due to complexity reasons, it may be cost-prohibitive or otherwise undesirable for an SFU to interpret relatively complex video syntax structures such as parameters sets or keep state of which parameter set is in use at a given time. However, in order for the SFU to decide whether it needs to forward a received SEI message (as identified by its NAL unit type, which is easily parseable from the NAL unit header), the SFU would need to know which profile is in use at the time (location in the NAL unit stream) of reception of the SEI NAL unit, then interpret the NAL unit type to identify the SEI message, then interpret the SEI payload, then remove the droppable SEI message while leaving non-droppable SEI messages in the NAL unit, then rewrite the NAL unit (including steps such as emulation prevention), and only then forward the NAL unit. The SEI payload can include any number of SEI messages, each with an 8 bit SEI type indication and information that allows to "skip" over the SEI payload related to that message to identify the next SEI payload. Insofar, an SFU that, according to the current state of the art, does not need to interpret data beyond the NAL unit header, would now need to interpret the SEI message for its content; possibly rewrite the message after removing unnecessary data but keeping the necessary data, and interpret, keep state, and associate with SEI messages at least the profile information from parameter sets. All this greatly increases the complexity of SFUs and may require at least software upgrade, but also possibly forklifting of SFU equipment because of the increased complexity of SFU processing. Any solution not relying on profiling is preferable from a network provider's viewpoint.

In a second embodiment, at least one, but advantageously two, NAL unit types that were previously unassigned can be assigned to indicate SEI messages that may be required by systems such as the ones listed above, involving NNVCs or VCM technologies. A single NAL unit type may be sufficient if the distinction currently available between prefix and suffix NAL unit types is unnecessary for required SEI messages. Two NAL unit types may need to be allocated if the distinction between prefix and suffix SEI messages need to be retained.

As a practical implementation example, reproduced below is the assignment for NAL unit types for non-VCL NAL units according to H.266.

| 12 | OPL_NUT | Operating point information operating_point_information_rbsp( ) | non-VCL |
|----|---------|----------------------------------------------------------------|---------|
| 13 | DCI_NUT | Decoding capability information decoding_capability_information_rbsp( ) | non-VCL |

-continued

| | | | |
|---|---|---|---|
| 14 | VPS_NUT | Video parameter set<br>video_parameter_set_rbsp( ) | non-VCL |
| 15 | SPS_NUT | Sequence parameter set<br>seq_parameter_set_rbsp( ) | non-VCL |
| 16 | PPS_NUT | Picture parameter set<br>pic_parameter_set_rbsp( ) | non-VCL |
| 17 | PREFIX_APS_NUT | Adaptation parameter set | non-VCL |
| 18 | SUFFIX_APS_NUT | adaptation_parameter_set_rbsp( ) | |
| 19 | PH_NUT | Picture header<br>picture_header_rbsp( ) | non-VCL |
| 20 | AUD_NUT | AU delimiter<br>access_unit_delimiter_rbsp( ) | non-VCL |
| 21 | EOS_NUT | End of sequence<br>end_of_seq_rbsp( ) | non-VCL |
| 22 | EOB_NUT | End of bitstream<br>end_of_bitstream_rbsp( ) | non-VCL |
| 23 | PREFIX_SEI_NUT | Supplemental enhancement information | non-VCL |
| 24 | SUFFIX_SEI_NUT | sei_rbsp( ) | |
| 25 | FD_NUT | Filler data<br>filler_data_rbsp( ) | non-VCL |
| 26 | RSV_NVCL_26 | Reserved non-VCL NAL unit types | non-VCL |
| 27 | RSV_NVCL_27 | | |
| 28..31 | UNSPEC_28..<br>UNSPEC_31 | Unspecified non-VCL NAL unit types | non-VCL |

To implement above mechanism, the currently reserved NAL unit types 26 and 27 could be assigned as follows:

| | | | |
|---|---|---|---|
| 26 | REQ_PRE_SEI_NUT | Supplemental enhancement information | non-VCL |
| 27 | REQ_SUF_SEI_NUT | sei_rbsp( ) (Required to process by decoder) | |

Using such a design, no significant changes to SFUs, middleboxes, and MANEs need to be made; certainly not for to hose middleboxes which are compliant with system layer standards that operate under the assumption to forward anything they do not understand on the theory that doing so creates more robust networks. Middleboxes and MANEs that are configured to drop previously undefined or unspecified NAL unit types may require an upgrade, but since the change is minimal, it is envisioned that software upgrades should suffice in many cases. The key disadvantage of this approach is that the number of available NAL unit types is limited. Specifically, a design change according to this embodiment would populate at least one and possibly two of the remaining two reserved NAL unit types.

Briefly referring to FIG. 5, a variant to the above design would be to allocate the currently reserved nuh_reserved_zero_bit (504) to indicate, for NAL unit types 26 or 27 (SEI messages), and/or for other VCL or non-VCL NAL units to signal that the NAL unit may be "required". This design alternative has the least overhead and may not have any shortcoming except that, once allocated, the bit cannot be used for any other purpose. Considering the limited codepoint space left in the NAL unit header, such an assignment may be too costly from a standards writing viewpoint.

In a third embodiment a preferably single NAL unit type, for example the previously reserved NAL unit type 26, is allocated to a new Required Container NAL unit. The Required Container NAL unit can serve as a container for prefix or suffix SEI messages as well as other NAL units that do not need to be processed by a decoder, to signal to the decoder and to middleboxes that the NAL units carried inside the container are required for the system in use. Examples for other NAL units can include, for example, the AUD NAL unit which is known to be relied on in some systems, the EOS NAL Unit, or the EOB NAL unit.

A NAL unit header with fields populated as follows:
Forbidden_zero_bit equal to 0
nuh_reserved_zero_bit equal to 0
nuh_layer_id equal to the lowest layer_id of all NAL units carried inside the Required Container SEI, or, in the same or another embodiment, to 0
nal_unit_type equal to an unassigned NAL unit type, preferably to an unassigned reserved non-VCL NAL unit type, for example to 26 or 27.
nuh_temporal_id_plus1 equal to 0

Figure 7:
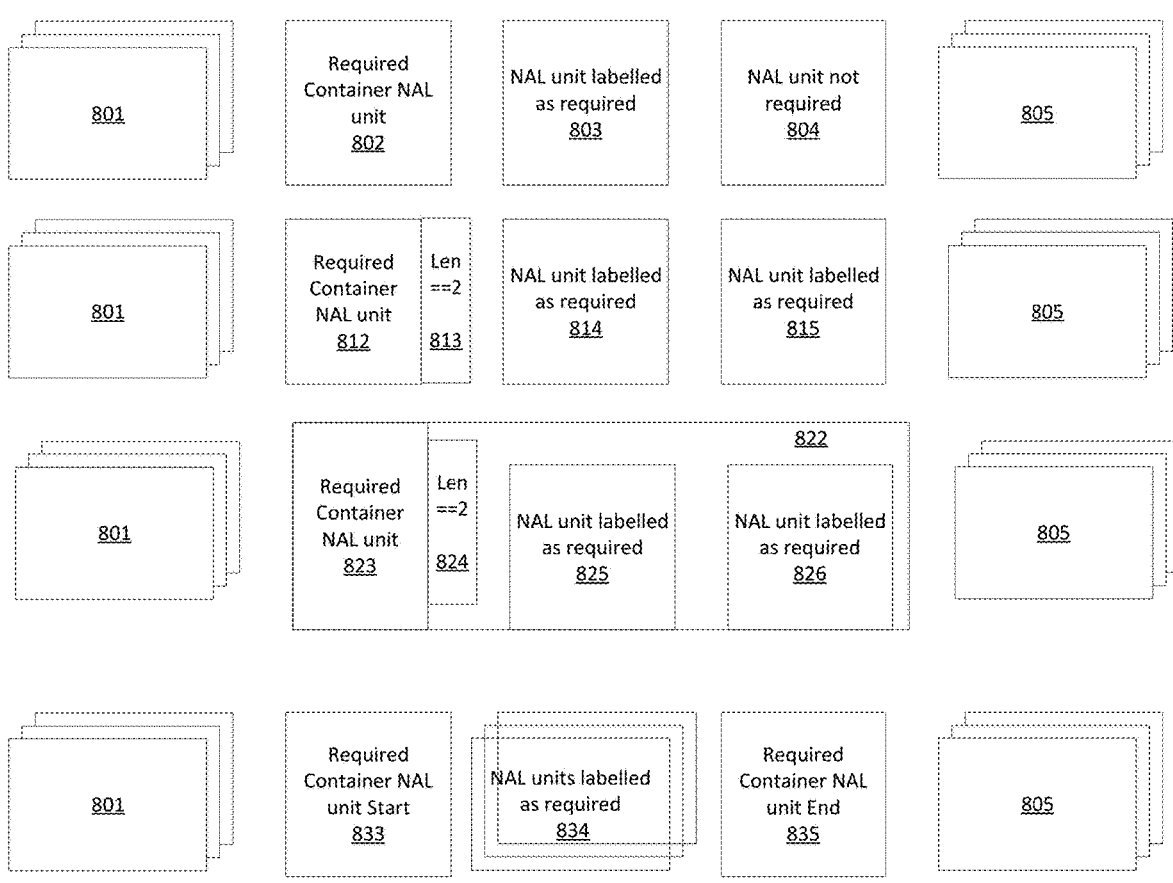
FIG. 7 is a schematic illustration of signaling the required presence of SEI message or other NAL units through a Required Container NAL unit, in accordance with an embodiment.

The NAL unit header can be followed by one or more NAL units that may be required by the receiving system even if they may not be required for the decoding process of chroma or luma samples. There are many options to structure that syntax, some of which are described below:

Referring to FIG. 7, in the same or another embodiment the payload of the Required Container NAL unit may be empty; that is, the Required Container NAL unit is composed only to the aforementioned NAL unit header. The Required Container NAL unit may pertain to the exactly one NAL unit following the Required Container NAL unit. In that case, the single NAL unit immediately trailing the Required Container NAL unit may be interpreted as required to be processed by the receiving system. To illustrate this, shown is a NAL unit stream in decoding order comprising any number of leading NAL units (801), a Required Container NAL unit (802), a NAL unit (803) that is, through the preceding presence of the Required Container NAL unit (802) labelled as required, another NAL unit (804) that is not immediately preceded by a Required Container NAL unit and hence not labelled as required, and any number of further NAL units (805).

Having such a comparatively easy to implement mechanism has advantages, including that no state needs to be kept except for the processing of the NAL unit immediately following a Required Container NAL unit. That can be beneficial from an implementation complexity viewpoint as well as from an error resilience viewpoint. The number of NAL units that will, in some cases, need to be labelled as required is likely small (such as: one per picture), because even if multiple SEI messages were in need to be labelled as "required", such SEI messages could be included into a single Prefix or Suffix SEI NAL unit using the mechanism described above in the context of FIG. 5. The required overhead to label a single NAL unit as required can be the size of the Required Container NAL unit, which in H.266 syntax would be 16 bits. Another advantage can be that this mechanism is backward compatible in that if a decoder or middlebox does not understand the Required Container NAL unit, it throws it away and the overall system design is no worse off than without the Required Container NAL unit.

In order to reduce that overhead in case more than one (consecutive or spaced out) NAL units need to be labelled as required, several options can be considered.

Again referring to FIG. 7, in a fourth embodiment, the Required Container NAL unit may be used to more one or more NAL units as required. Following the NAL unit header of the Required Container NAL unit, a single syntax element, for example a single byte, may be used to indicate the number of NAL units or the number of bytes to which the Required Container NAL unit applies. In a NAL unit stream there may be any number of preceding NAL units (801) followed by a Required Container NAL unit (812) that includes a length field (813) indicative, for example, the number of following NAL units that are labelled as "required" and is set here to a value of 2. Accordingly, the next two NAL units (814, 815) are labelled as "required". Any number of following NAL units (805) are not required, unless another Required Container SEI were encountered in the NAL unit stream (not depicted). This mechanism has the disadvantage that the minimum size of the Required Container NAL unit is 24 bits instead of 16 (of the third embodiment), and that the state of "Required" needs to be maintained for more consecutive NAL units. Further, while processing this flavor of a Required Container NAL unit is relatively straightforward, the encoder/sender implementation needs to know the number of required NAL units that will follow before writing the Required Container NAL unit, which may be difficult in certain implementations.

Still referring to FIG. 7, in a fifth embodiment, the Required Container NAL unit can encapsulate one or more NAL units. A NAL unit stream may consist of any number of preceding NAL units (801), followed by a Required Container NAL unit (822) that consists of its NAL unit header (823) as already introduced, and a length field (824). That Required Container NAL unit may encapsulate, for example, an Access Unit Delimiter NAL unit (825) and a prefix SEI NAL unit (826). The length field (824) may be interpreted, for example in units of bytes that follow, or in units of NAL units that follow. The advantage of such a mechanism can be bitrate savings when the Required Container NAL unit carries two or more NAL units. One disadvantage can be that such a mechanism may not be easily implemented in a backward compatible fashion without also redundantly including the encapsulated NAL units in the NAL unit stream, which in turn may negate the bitrate savings.

In a sixth embodiment, two new NAL unit types could be used one for a Required Container NAL unit Start (833), and another for a Required Container NAL unit End (835). Any NAL units (834) in the NAL unit stream located, in decoding order, between these start and end tags can be labelled as "required". This mechanism requires the allocation of two NAL unit types, and has error resilience issues, but is easy to implement and efficient if there were many consecutive NAL units that need to be labelled as "required".

In one or more examples, one NAL unit type that was previously unassigned may be assigned to indicate an empty NAL unit (e.g., a NAL unit with a zero-length RBSP), or a NAL unit with minimal control information in its RBSP, so to indicate that following NAL unit(s), potentially regardless of type, are "required". In this scenario, mandatory decoder action on NAL units marked with a Required NAL Unit prefix may not be prescribed, which may be a fundamental change in the concepts of optional NAL units, including SEIs. However, the semantics may indicate that a NAL Unit marked as "Required", when dropped from a NAL unit stream through actions of a MANE, would adversely affect the user experience, possibly to a point that the decoded bitstream would be useless for the receiving system. In one or more examples, certain TVs and set-top-boxes responsive to DVB-protocol encapsulated HEVC bitstreams reportedly are unable to correctly act on bitstreams lacking the Access Unit Delimiter NAL unit. That NAL unit is optional in HEVC (and AVC, and VVC), but its use is mandated by DVB specs. If, in a heterogeneous transmission system involving, for example, a webrtc feed into a DVB broadcast, the DVB-compliant encoder were to include AUDs, the coupled webrtc-based transmission chain (including MANEs) would drop them for bandwidth or whatever reasons (which they are free to do so, according to their spec), and the webrtc-transported bitstream were fed into a DVB transport for transmission to users, user devices may fail because the webrtc devices have dropped the AUDs.

In one or more examples, a Required NAL Unit prefix may be follows:

| 26 | REQ_NU | Required NAL unit req_nu_rbsp( ) | non-VCL |

Syntax:

| | Descriptor |
|---|---|
| req_nu_rbsp( ) {<br>} | |

In one or more examples, when a REQ_NU NAL unit is present, the immediately following NAL unit may be considered as essential for the application. From a decoder's viewpoint, the reception of this NAL unit may be a no-op. In other words, while a smart decoder could possibly take a clue from the fact that an encoder or sending system bothered to put that NAL unit into the bitstream and act accordingly, from a standard's viewpoint, the decoder can ignore it.

In one or more examples, the syntax of the Required NAL Unit may be as follows:

| | Descriptor |
|---|---|
| req_nu_rbsp( ) {<br>  req_nu_count_minus1<br>} | ue(v) |

In one or more examples, when a REQ_NU NAL unit is present, the immediately following req_nu_count_minus1+1 NAL units may be considered as essential for the application.

The embodiments provide the following advantages. From a narrow video coding standards' viewpoint, there is no issue as this nu-req NAL unit type is unspecified and hence, will be ignored by a decoder. If a legacy transmission chain does not understand the nu_req NAL unit type, depending on its design, it will either forward the weird NAL unit, or it will drop it. If it forwards it, the mechanism works fine further downstream, though that particular transmission chain will not specifically act on it and do what it always did (including potentially dropping required NAL units).

If in a modern transmission chain the nu_req is correctly interpreted, but NAL unit losses occur, then the following subcases can be envisioned. First a nu_req gets lost. The transmission chain is free to remove the unmarked (through the loss) required NAL unit. However, an encoder is free to include multiple redundant copies of the nu_req in the bitstream to increase the statistical likelihood that at least one of those nu_req messages get through. Second, the required NAL unit following a nu_req gets lost. In this case, the receiving application would get into trouble, and further, a NAL unit were marked as "required" that's not really "required in the sense of this design. From a receiving application's viewpoint, there's nothing that can be done except rely on general error resilience design considerations (e.g., build for robustness, and worst case re-sync to the stream). As for the bitstream syntax, and from a standards viewpoint, marking the wrong NAL unit as required does not have any effect, as the decoder throws that information away anyway.

In one or more examples, an AU includes of one or more PUs in increasing order of nuh_layer_id.

In one or more examples, there can be at most one AUD NAL unit in an AU. When an AUD NAL unit is present in an AU, it shall be the first NAL unit of the AU, and consequently, it is the first NAL unit of the first PU of the AU. When vps_max_layers_minus1 is greater than 0, there shall be one and only one AUD NAL unit in each IRAP or GDR AU.

In one or more examples, there can be at most one OPI NAL unit in an AU. When an OPI NAL unit is present in an AU, it shall be the first NAL unit following the AUD NAL unit, if any, and otherwise shall be the first NAL unit of the AU.

In one or more examples, there can be at most one EOB NAL unit in an AU.

In one or more examples, when an EOB NAL unit is present in an AU, it shall be the last NAL unit of the AU, and consequently, it is the last NAL unit of the last PU of the AU.

A VCL NAL unit may be the first VCL NAL unit of an AU (and consequently the PU containing the VCL NAL unit is the first PU of the AU) when the VCL NAL unit is the first VCL NAL unit of a picture, and one or more of the following conditions are true:

The value of nuh_layer_id of the VCL NAL unit is less than or equal to the nuh_layer_id of the previous picture in decoding order.

The value of ph_pic_order_cnt_lsb of the VCL NAL unit differs from the ph_pic_order_cnt_lsb of the previous picture in decoding order.

PicOrderCntVal derived for the VCL NAL unit differs from the PicOrderCntVal of the previous picture in decoding order.

In one or more examples, the firstVclNalUnitInAu may be the first VCL NAL unit of an AU. The first of any of the following NAL units preceding firstVclNalUnitInAu and succeeding the last VCL NAL unit preceding firstVclNalUnitInAu, if any, specifies the start of a new AU:

AUD NAL unit (when present),
OPI NAL unit (when present),
DCI NAL unit (when present),
VPS NAL unit (when present),
SPS NAL unit (when present),
PPS NAL unit (when present),
Prefix APS NAL unit (when present),
PH NAL unit (when present),
Prefix SEI NAL unit (when present),
NAL unit with nal_unit_type equal to RSV_NVCL_27 (when present),
NAL unit with nal_unit_type in the range of UNSPEC28 . . . UNSPEC29 (when present).

In one or more examples, the first NAL unit preceding firstVclNalUnitInAu and succeeding the last VCL NAL unit preceding firstVclNalUnitInAu, if any, is one of these types of NAL units. In one or more examples, it is a requirement of bitstream conformance that, when present, the next PU of a particular layer after an EOS NAL unit that belongs to the same layer shall be an IRAP or GDR PU.

In one or more examples, a PU consists of zero or one PH NAL unit, one coded picture, which comprises of one or more VCL NAL units, and zero or more other non-VCL NAL units.

In one or more examples, when a picture consists of more than one VCL NAL unit, a PH NAL unit shall be present in the PU.

In one or more examples, when a VCL NAL unit has sh_picture_header_in_slice_header_flag equal to 1 or is the first VCL NAL unit that follows a PH NAL unit, the VCL NAL unit is the first VCL NAL unit of a picture.

In one or more examples, the order of the non-VCL NAL units (other than the AUD, OPI, and EOB NAL units) within a PU shall obey the following constraints:

When a PH NAL unit is present in a PU, it shall precede the first VCL NAL unit of the PU.

When any DCI NAL units, VPS NAL units, SPS NAL units, PPS NAL units, prefix SEI NAL units, NAL units with nal_unit_type equal to RSV_NVCL_27, or NAL units with nal_unit_type in the range of UNSPEC_28 . . . UNSPEC_29 are present in a PU, they shall not follow the last VCL NAL unit of the PU.

When any DCI NAL units, VPS NAL units, SPS NAL units, or PPS NAL units are present in a PU, they shall precede the PH NAL unit (when present) of the PU and shall precede the first VCL NAL unit of the PU.

NAL units having nal_unit_type equal to SUFFIX_SEI_NUT, FD_NUT, or RSV_NVCL_27, or in the range of UNSPEC_30 . . . UNSPEC_31 in a PU shall not precede the first VCL NAL unit of the PU.

When any prefix APS NAL units are present in a PU, they shall precede the first VCL NAL unit of the PU.

When any suffix APS NAL units are present in a PU, they shall follow the last VCL NAL unit of the PU.

When an EOS NAL unit is present in a PU, it shall be the last NAL unit among all NAL units within the PU other than other EOS NAL units (when present) or an EOB NAL unit (when present).

When a REQ_SEI_NUT NAL unit is present, the immediately following PREFIX_SEI_NUT or SUFFIX_

SEI_NUT is considered as essential for the application. The reaction of a decoder the REQ_NU NAL units is unspecified.

Or

When a REQ_NU NAL unit is present, the immediately following NAL unit is considered as essential for the application. The reaction of a decoder the REQ_NU NAL units is unspecified.

Or

When a REQ_NU NAL unit is present, the immediately following req_nu_count_minus1+1 NAL units are considered as essential for the application. The reaction of a decoder the REQ_NU NAL units is unspecified.

In one or examples, versatile SEI RBSP syntax includes:

|  | Descriptor |
|---|---|
| vsei_rbsp( ) { | |
| vsei_importance | u(1) |
| vsei_reserved | u(7) |
| versatile_sei_message( ) | |
| rbsp_trailing_bits( ) | |
| } | |

In one or more examples, versatile supplemental enhancement information RBSP contains information that is not necessary to decode the samples of coded pictures from VCL NAL units. A VSEI RBSP may contain one VSEI message.

In one or more examples, vsei_importance equal 1 indicates that the versatile SEI message may be an important or required. In one or more examples, vsei_importance equal 0 indicates that the versatile SEI message does not have particular importance. In one or more examples, an entity that is aware of this flag may use this information when it needs to make decision whether or not to deliver/drop the verstatile SEI message.

In one or more examples, versatile SEI message syntax includes:

|  | Descriptor |
|---|---|
| versatile_sei_message( ) { | |
| vsei_payload_type_byte | u(8) |
| vsei_payload( vseiPayloadType ) | |
| } | |

In one or more examples, versatile Supplemental enhancement information RBSP contains information that is not necessary to decode the samples of coded pictures from VCL NAL units. A VSEI RBSP may contain one VSEI message.

In one or more examples, each versatile SEI message consists of the variables specifying the importance and type payloadType of the SEI message payload. In one or more examples, the NAL unit byte sequence containing the SEI message might include one or more emulation prevention bytes (represented by emulation_prevention_three_byte syntax elements).

In one or more examples, vsei_payload_type_byte is a byte of the payload type of a versatile SEI message.

Various modification and combinations of aforementioned techniques can be devised by a person skilled in the art.

The techniques for signaling required NAL units, described above, can be implemented as computer software using computer-readable instructions and physically stored in one or more computer-readable media. For example, FIG. 8 shows a computer system 900 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 8:
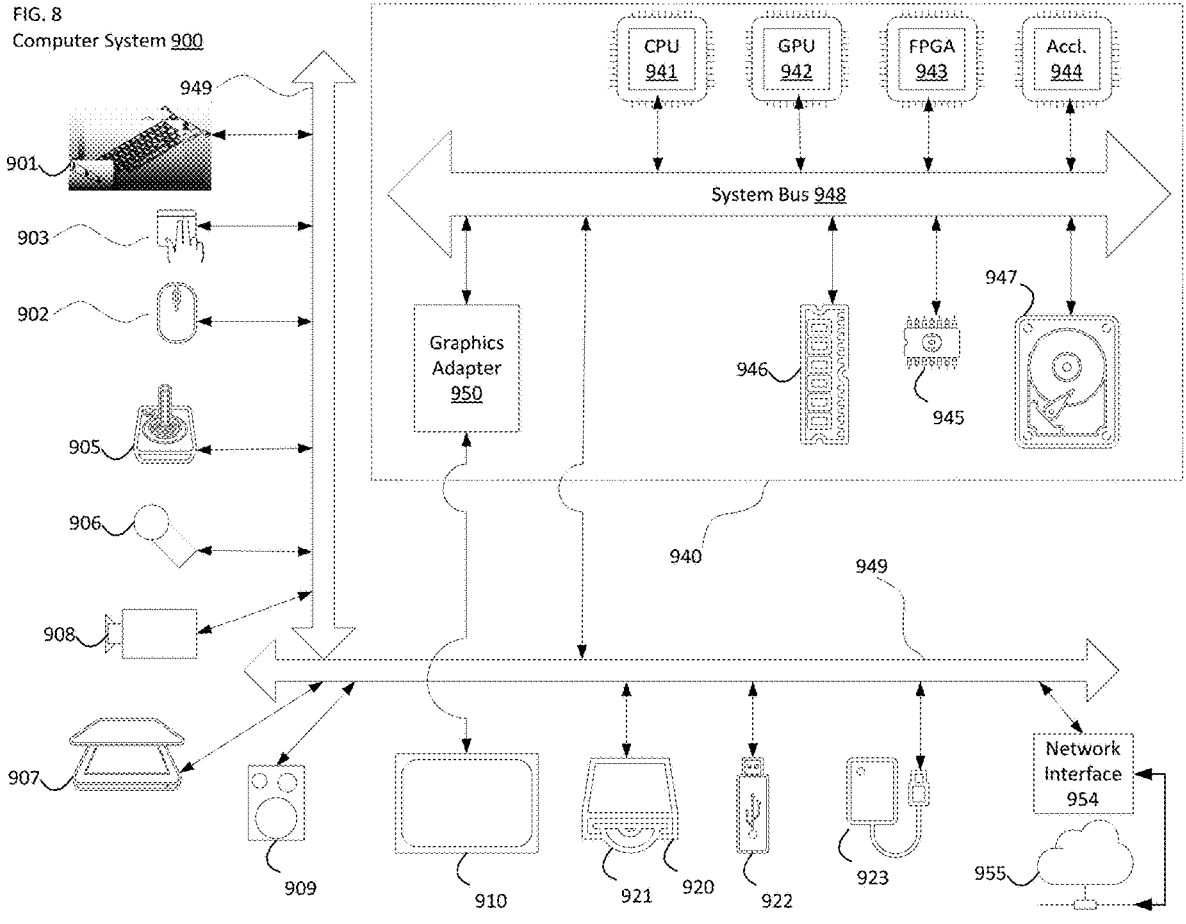
FIG. 8 is a schematic illustration of a computer system in accordance with an embodiment.

The components shown in FIG. 8 for computer system 900 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 900.

Computer system 900 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 901, mouse 902, trackpad 903, touch screen 910, data-glove 904, joystick 905, microphone 906, scanner 907, camera 908.

Computer system 900 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 910, data-glove 904, or joystick 905, but there can also be tactile feedback devices that do not serve as input devices), audio output devices (such as: speakers 909, headphones (not depicted)), visual output devices (such as screens 910 to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system 900 can also include human accessible storage devices and their associated media such as optical media including CD/DVD ROM/RW 920 with CD/DVD or the like media 921, thumb-drive 922, removable hard drive or solid state drive 923, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 900 can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (949) (such as, for example USB ports of the computer system 900; others are commonly integrated into the core of the computer system 900 by attachment to a system bus as described below (for example Ethernet interface into a PC computer system or cellular network interface into a smartphone computer system). Using any of these networks, computer system 900 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 940 of the computer system 900.

The core 940 can include one or more Central Processing Units (CPU) 941, Graphics Processing Units (GPU) 942, specialized programmable processing units in the form of Field Programmable Gate Areas (FPGA) 943, hardware accelerators for certain tasks 944, and so forth. These devices, along with Read-only memory (ROM) 945, Random-access memory 946, internal mass storage such as internal non-user accessible hard drives, SSDs, and the like 947, may be connected through a system bus 948. In some computer systems, the system bus 948 can be accessible in the form of one or more physical plugs to enable extensions by additional CPUs, GPU, and the like. The peripheral devices can be attached either directly to the core's system bus 948, or through a peripheral bus 949. Architectures for a peripheral bus include PCI, USB, and the like.

CPUs 941, GPUs 942, FPGAs 943, and accelerators 944 can execute certain instructions that, in combination, can make up the aforementioned computer code. That computer code can be stored in ROM 945 or RAM 946. Transitional data can be also be stored in RAM 946, whereas permanent data can be stored for example, in the internal mass storage 947. Fast storage and retrieve to any of the memory devices can be enabled through the use of cache memory, that can be closely associated with one or more CPU 941, GPU 942, mass storage 947, ROM 945, RAM 946, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 900, and specifically the core

940 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 940 that are of non-transitory nature, such as core-internal mass storage 947 or ROM 945. The software implementing various embodiments of the present disclosure can be stored in such devices and executed by core 940. A computer-readable medium can include one or more memory devices or chips, according to particular needs. The software can cause the core 940 and specifically the processors therein (including CPU, GPU, FPGA, and the like) to execute particular processes or particular parts of particular processes described herein, including defining data structures stored in RAM 946 and modifying such data structures according to the processes defined by the software. In addition or as an alternative, the computer system can provide functionality as a result of logic hardwired or otherwise embodied in a circuit (for example: accelerator 944), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The above disclosure also encompasses the embodiments listed below:

(1) A method of video decoding performed by at least one processor of a decoder, the method including: receiving (i) one or more encoded pictures and (ii) a NAL unit stream comprising at least one first Network Abstraction Layer Unit (NAL unit) of a first type; interpreting the first NAL unit; and decoding at least one of the one or more encoded pictures in accordance with the interpreting the first NAL unit, in which the decoder is informed that the first NAL unit cannot be discarded by the decoder through at least one of: a profile indicated by a value of a profile identifier in an active parameter set, the first type being indicative of a second NAL unit type, the second NAL unit type being a NAL unit in the NAL unit stream that is not required for the decoding of chroma or luma samples by the decoder, the first NAL unit being preceded by a Required Container NAL unit of a third NAL unit type, the first NAL unit being preceded by a Required Container NAL unit including a field indicating a number of following NAL units, the first NAL unit being encapsulated by a Required Container NAL unit, and the first NAL unit being preceded by a Required Container NAL unit Start and being followed by a Required Container NAL unit end.

(2) The method according to feature (1), in which the profile indicates that the first NAL unit of the first type cannot be discarded by the decoder.

(3) The method according to feature (1) or (2), in which the profile indicates that the NAL unit stream comprises a first supplemental enhancement information (SEI) message that cannot be discarded and a second SEI message that can be discarded.

(4) The method according to any one of features (1)-(3), in which the profile indicates that each supplemental enhancement information (SEI) message in the NAL unit stream (i) located at a predetermined interval, (ii) associated with a key frame, or (iii) associated with a trigger event cannot be discarded by the decoder.

(5) The method according to any one of features (1)-(4), in which the active parameter set is a sequence parameter set.

(6) The method according to feature (1), in which the Required Container NAL unit is empty.

(7) The method according to feature (1) or (6), in which the first NAL unit immediately follows the Required Container NAL unit, and in which the NAL unit stream comprises a second NAL unit that immediately follows the first NAL unit, and in which the second NAL unit can be discarded by the decoder.

(8) The method according to feature (1), in which the Required Container NAL unit comprises a NAL unit header that includes the field indicating the number of following NAL units, in which the NAL units immediately following corresponding to the number of following NAL units cannot be discarded by the decoder.

(9) The method according to feature (1) or (8), in which the NAL unit stream comprises a plurality of NAL units including the first NAL unit that are encapsulated by the Required Container NAL unit, in which each NAL unit encapsulated by the Required Container NAL unit cannot be discarded by the decoder.

(10) The method according to any one of feature 1, in which the NAL unit stream comprises a plurality of NAL units including the first NAL unit that are located between the Required Container NAL unit Start and the Required Container NAL unit End, in which each NAL unit located between the Required Container NAL unit Start and the Required Container NAL unit End cannot be discarded by the decoder.

(11) A method of video encoding performed by at least one processor of an encoder, the method comprising: generating a NAL unit stream comprising at least one first Network Abstraction Layer Unit (NAL unit) of a first type; and encoding one or more encoded pictures in accordance with the first NAL unit, in which the NAL unit stream indicates that the first NAL unit cannot be discarded through at least one of: a profile indicated by a value of a profile identifier in an active parameter set, the first type being indicative of a second NAL unit type, the second NAL unit type being a NAL unit in the NAL unit stream that is not required for processing chroma or luma samples, the first NAL unit being preceded by a Required Container NAL unit of a third NAL unit type, the first NAL unit being preceded by a Required Container NAL unit including a field indicating a number of following NAL units, the first NAL unit being encapsulated by a Required Container NAL unit, and the first NAL unit being preceded by a Required Container NAL unit Start and being followed by a Required Container NAL unit end.

(12) The method according to feature (11), in which the profile indicates that the first NAL unit of the first type cannot be discarded.

(13) The method according to feature (11) or (12), in which the profile indicates that the NAL unit stream comprises a first supplemental enhancement information (SEI) message that cannot be discarded and a second SEI message that can be discarded.

(14) The method according to any one of features (11)-(13), in which the profile indicates that each supplemental enhancement information (SEI) message in the NAL unit stream (i) located at a predetermined interval, (ii) associated with a key frame, or (iii) associated with a trigger event cannot be discarded.

(15) The method according to any one of features (11)-(14), in which the active parameter set is a sequence parameter set.

(16) The method according to feature (11), in which the Required Container NAL unit is empty.

(17) The method according to feature (11) or (16), in which the first NAL unit immediately follows the Required Container NAL unit, and in which the NAL unit stream comprises a second NAL unit that immediately follows the first NAL unit, and in which the second NAL unit can be discarded.

(18) The method according to feature (11), in which the Required Container NAL unit comprises a NAL unit header that includes the field indicating the number of following NAL units, in which the NAL units immediately following corresponding to the number of following NAL units cannot be discarded.

(19) The method according to feature (11) or (18), in which the NAL unit stream comprises a plurality of NAL units including the first NAL unit that are encapsulated by the Required Container NAL unit, in which each NAL unit encapsulated by the Required Container NAL unit cannot be discarded.

(20) A method performed by at least one processor, the method including: receiving a NAL unit stream comprising at least one first Network Abstraction Layer Unit (NAL unit) of a first type, in which a decoder is informed that the first NAL unit cannot be discarded by the decoder through at least one of: a profile indicated by a value of a profile identifier in an active parameter set, the first type being indicative of a second NAL unit type, the second NAL unit type being a NAL unit in the NAL unit stream that is not required for the decoding of chroma or luma samples by the decoder, the first NAL unit being preceded by a Required Container NAL unit of a third NAL unit type, the first NAL unit being preceded by a Required Container NAL unit including a field indicating a number of following NAL units, the first NAL unit being encapsulated by a Required Container NAL unit, and the first NAL unit being preceded by a Required Container NAL unit Start and being followed by a Required Container NAL unit end.

The invention claimed is:

1. A method of video decoding performed by at least one processor of a decoder, the method comprising:

receiving (i) one or more encoded pictures and (ii) a NAL unit stream comprising at least one first Network Abstraction Layer Unit (NAL unit) of a first type;

interpreting the first NAL unit; and decoding at least one of the one or more encoded pictures in accordance with the interpreting the first NAL unit corresponding to a supplemental enhancement information (SEI) message, wherein the decoder is informed that the first NAL unit cannot be discarded by the decoder through at least one of:

a profile indicated by a value of a profile identifier in an active parameter set, the first type being indicative of a second NAL unit type, the second NAL unit type being a NAL unit in the NAL unit stream that is not required for the decoding of chroma or luma samples by the decoder, the first NAL unit being preceded by a Required Container NAL unit of a third NAL unit type, the first NAL unit being preceded by a Required Container NAL unit including a field indicating a number of following NAL units, the first NAL unit being encapsulated by a Required Container NAL unit, and the first NAL unit being preceded by a Required Container NAL unit Start and being followed by a Required Container NAL unit end.

2. The method according to claim 1, wherein the profile indicates that the first NAL unit of the first type cannot be discarded by the decoder.

3. The method according to claim 1, wherein the profile indicates that the NAL unit stream comprises a first SEI message that cannot be discarded and a second SEI message that can be discarded.

4. The method according to claim 1, wherein the profile indicates that each SEI message in the NAL unit stream is (i) located at a predetermined interval, (ii) associated with a key frame, or (iii) associated with a trigger event cannot be discarded by the decoder.

5. The method according to claim 1, wherein the active parameter set is a sequence parameter set.

6. The method according to claim 1, wherein the Required Container NAL unit is empty.

7. The method according to claim 1, wherein the first NAL unit immediately follows the Required Container NAL unit, and wherein the NAL unit stream comprises a second NAL unit that immediately follows the first NAL unit, and wherein the second NAL unit can be discarded by the decoder.

8. The method according to claim 1, wherein the Required Container NAL unit comprises a NAL unit header that includes the field indicating the number of following NAL units, wherein the NAL units immediately following corresponding to the number of following NAL units cannot be discarded by the decoder.

9. The method according to claim 1, wherein the NAL unit stream comprises a plurality of NAL units including the first NAL unit that are encapsulated by the Required Container NAL unit, wherein each NAL unit encapsulated by the Required Container NAL unit cannot be discarded by the decoder.

10. The method according to claim 1, wherein the NAL unit stream comprises a plurality of NAL units including the first NAL unit that are located between the Required Container NAL unit Start and the Required Container NAL unit End, wherein each NAL unit located between the Required Container NAL unit Start and the Required Container NAL unit End cannot be discarded by the decoder.

11. A method of video encoding performed by at least one processor of an encoder, the method comprising:

generating a NAL unit stream comprising at least one first Network Abstraction Layer Unit (NAL unit) of a first type; and encoding one or more encoded pictures in accordance with the first NAL unit corresponding to a supplemental enhancement information (SEI) message, wherein the NAL unit stream indicates that the first NAL unit cannot be discarded through at least one of:

a profile indicated by a value of a profile identifier in an active parameter set, the first type being indicative of a second NAL unit type, the second NAL unit type being a NAL unit in the NAL unit stream that is not required for processing chroma or luma samples, the first NAL unit being preceded by a Required Container NAL unit of a third NAL unit type, the first NAL unit being preceded by a Required Container NAL unit including a field indicating a number of following NAL units, the first NAL unit being encapsulated by a Required Container NAL unit, and the first NAL unit being preceded by a Required Container NAL unit Start and being followed by a Required Container NAL unit end.

12. The method according to claim 11, wherein the profile indicates that the first NAL unit of the first type cannot be discarded.

13. The method according to claim 11, wherein the profile indicates that the NAL unit stream comprises a first SEI message that cannot be discarded and a second SEI message that can be discarded.

14. The method according to claim 11, wherein the profile indicates that each SEI message in the NAL unit stream (i) located at a predetermined interval, (ii) associated with a key frame, or (iii) associated with a trigger event cannot be discarded.

15. The method according to claim 11, wherein the active parameter set is a sequence parameter set.

16. The method according to claim 11, wherein the Required Container NAL unit is empty.

17. The method according to claim 11, wherein the first NAL unit immediately follows the Required Container NAL unit, and wherein the NAL unit stream comprises a second NAL unit that immediately follows the first NAL unit, and wherein the second NAL unit can be discarded.

18. The method according to claim 11, wherein the Required Container NAL unit comprises a NAL unit header that includes the field indicating the number of following NAL units, wherein the NAL units immediately following corresponding to the number of following NAL units cannot be discarded.

19. The method according to claim 11, wherein the NAL unit stream comprises a plurality of NAL units including the first NAL unit that are encapsulated by the Required Container NAL unit, wherein each NAL unit encapsulated by the Required Container NAL unit cannot be discarded.

20. A method performed by at least one processor, the method comprising:

receiving a NAL unit stream comprising at least one first Network Abstraction Layer Unit (NAL unit) of a first type corresponding to a supplemental enhancement information (SEI) message, wherein a decoder is informed that the first NAL unit cannot be discarded by the decoder through at least one of:

a profile indicated by a value of a profile identifier in an active parameter set, the first type being indicative of a second NAL unit type, the second NAL unit type being a NAL unit in the NAL unit stream that is not required for the decoding of chroma or luma samples by the decoder, the first NAL unit being preceded by a Required Container NAL unit of a third NAL unit type, the first NAL unit being preceded by a Required Container NAL unit including a field indicating a number of following NAL units, the first NAL unit being encapsulated by a Required Container NAL unit, and the first NAL unit being preceded by a Required Container NAL unit Start and being followed by a Required Container NAL unit end.

* * * * *